(12) United States Patent
Tarlow et al.

(10) Patent No.: US 9,928,040 B2
(45) Date of Patent: Mar. 27, 2018

(54) SOURCE CODE GENERATION, COMPLETION, CHECKING, CORRECTION

(71) Applicant: Microsoft Technology Licensing, LLC, Redmond, WA (US)

(72) Inventors: Daniel Stefan Tarlow, Cambridge (GB); Christopher Joseph Maddison, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/190,221

(22) Filed: Feb. 26, 2014

(65) Prior Publication Data

US 2015/0135166 A1     May 14, 2015

Related U.S. Application Data

(60) Provisional application No. 61/902,827, filed on Nov. 12, 2013.

(51) Int. Cl.
G06F 9/44       (2006.01)
G06F 11/36      (2006.01)
G06F 17/27      (2006.01)

(52) U.S. Cl.
CPC ............... *G06F 8/34* (2013.01); *G06F 8/30* (2013.01); *G06F 8/75* (2013.01); *G06F 11/3604* (2013.01); *G06F 17/27* (2013.01)

(58) Field of Classification Search
None
See application file for complete search history.

(56) References Cited

U.S. PATENT DOCUMENTS

| | | | |
|---|---|---|---|
| 6,694,482 B1 * | 2/2004 | Arellano | G06F 17/30017 707/E17.009 |
| 7,152,228 B2 | 12/2006 | Goodwin et al. | |
| 7,617,479 B2 | 11/2009 | Hambrick et al. | |
| 8,365,148 B2 | 1/2013 | Millmore | |
| 8,572,572 B2 | 10/2013 | Morgan et al. | |
| 2007/0006177 A1 * | 1/2007 | Aiber | G06Q 10/10 717/136 |

(Continued)

OTHER PUBLICATIONS

Reiss, "Automatic Code Stylizing", Proceedings of the twenty-second IEEE/ACM international conference on Automated Software Engineering (ASE '07), pp. 74-83, New York, NY, 2007.*

(Continued)

*Primary Examiner* — S. Sough
*Assistant Examiner* — Timothy Duncan (57) ABSTRACT

Automated generation, or completion, or checking of source code is described whereby a probabilistic model having been trained using a corpus of natural source code examples is used. In various examples the probabilistic model comprises probability distributions describing belief about structure of natural source code and takes into account source code analysis from a compiler or other source code analyzer. In various examples, source code analysis may comprise syntactic structure, type information and other data about source code. In various examples, the trained probabilistic model is used to predict sequences of source code elements. For example, to generate source code, to auto-complete source code, to error check source code, to error correct source code or for other purposes.

20 Claims, 6 Drawing Sheets

(56) References Cited

U.S. PATENT DOCUMENTS

| | | | |
|---|---|---|---|
| 2007/0250810 A1* | 10/2007 | Tittizer et al. | 717/110 |
| 2008/0256509 A1 | 10/2008 | Mazzeranghi | |
| 2008/0270989 A1* | 10/2008 | Ahadian et al. | 717/126 |
| 2012/0110030 A1 | 5/2012 | Pomponio | |
| 2012/0158791 A1* | 6/2012 | Kasneci | G06F 17/30958 707/798 |
| 2013/0282724 A1 | 10/2013 | Seitz et al. | |
| 2014/0282372 A1* | 9/2014 | Araya | G06F 8/76 717/106 |

OTHER PUBLICATIONS

Koo et al., "Hidden-Variable Models for Disciminative Reranking", in Proceedings of Human Language Technology Conference and Conference on Empirical Methods in Natural Language Processing (HLT/EMNLP), pp. 507-514, Vancouver, Oct. 2005.*

Altiparmak, et al. "Source Code Generation for Large Scale Applications", In Proceeding of the International Conference on Technological Advances in Electrical, Electronics and Computer Engineering, May 9, 2013, 7 pages.

Kats, et al., "The Spoofax Language Workbench", In Proceedings of the ACM International Conference on Object Oriented Programming Systems Languages and Applications, Oct. 17, 2010, 20 pages.

Krunic, et al., "An Approach to Model Driven Development and Automatic Source Code Generation of GUI Controls", In Proceeding of the IEEE 11th International Symposium on Intelligent Systems and Informatics, Sep. 26, 2013, 6 pages.

Huang, et al., "A Semi-Automatic Generator for Unit Testing Code Files Based on JUnit1 ", In Proceeding of the IEEE International Conference on Systems, Man and Cybernetics, vol. 1, Oct. 10, 2005, 6 pages.

Abney, et al., "Relating Probabilistic Grammars and Automata", In Proceedings of the 37th Annual Meeting of the Association for Computational Linguistics on Computational Linguistics, Jun. 20, 1999, 8 pages.

Allamanis, et al., "Mining Source Code Repositories at Massive Scale Using Language Modeling", In Proceedings of the Tenth International Workshop on Mining Software Repositories, May 18, 2013, 10 pages.

Charniak, Eugene, "Statistical Parsing with a Context Free Grammar and Word Statistics", In Proceedings of the Fourteenth National Conference on Artificial Intelligence and Ninth Conference on Innovative Applications of Artificial Intelligence, Jul. 27, 1997, 6 pages.

Charniak, Eugene, "A Maximum-Entropy-Inspired Parser", In Proceedings of the 1st North American Chapter of the Association for Computational Linguistics Conference, Apr. 29, 2000, pp. 8.

Duchi, et al., "Adaptive Subgradient Methods for Online Learning and Stochastic Optimization", In Journal of Machine Learning Research, vol. 12, Feb. 1, 2011, 39 pages.

Gulwani, Sumit, "Automating String Processing in Spreadsheets Using Input-Output Examples ", In Proceedings of the 38th Annual ACM SIGPLAN-SIGACT Symposium on Principles of Programming Languages, Jan. 26, 2011, 13 pages.

Conrad Halbert, Daniel, "Programming by Example ", In Doctoral Dissertation, Nov. 1984, 81 pages.

Hindle, et al., "On the Naturalness of Software ", In Proceedings of the International Conference on Software Engineering. Jun. 2, 2012, 11 pages.

Klein, et al., "Fast Exact Inference with a Factored Model for Natural Language Parsing ", In Proceedings of Advances in Neural Information Processing Systems, vol. 15, Dec. 9, 2002, 8 pages.

Klein, et al., "Accurate Unlexicalized Parsing ", In Proceedings of the 41st Annual Meeting on Association for Computational Linguistics, vol. 1, Jul. 7, 2003, 8 pages.

Liang, et al., "Learning Programs: A Hierarchical Bayesian Approach ", In Proceedings of the 27th International Conference on Machine Learning, Jun. 21, 2010, 8 pages.

Matsuzaki, et al., "Probabilistic CFG with Latent Annotations ", In Proceedings of the 43rd Annual Meeting on Association for Computational Linguistics, Jun. 25, 2005, 8 pages.

Mc Closky, et al., "Effective Self-Training for Parsing ", In Proceedings of the Main Conference on Human Language Technology Conference of the North American Chapter of the Association of Computational Linguistics, Jun. 4, 2006, 8 pages.

Mnih, et al., "Three New Graphical Models for Statistical Language Modelling ", In Proceedings of the 24th International Conference on Machine learning, Jun. 20, 2007, 8 pages.

"Microsoft Roslyn CTP ", Oct. 24, 2011, Available at: http://msdn.microsoft.com/en-gb/roslyn.

Saul, et al., "Aggregate and Mixed-Order Markov Models for Statistical Language Processing ", In Proceedings of the Second Conference on Empirical Methods in Natural Language Processing, Jun. 9, 1997, 9 pages.

Tarlow, et al. "Structured Generative Models of Natural Source Code", Jan. 2, 2014 available at: http://arxiv.org/pdf/1401.0514v1.pdf.

* cited by examiner

SOURCE CODE GENERATION, COMPLETION, CHECKING, CORRECTION

CROSS-REFERENCE TO RELATED APPLICATION(S)

This non-provisional utility application claims priority to U.S. provisional application Ser. No. 61/902,827 entitled "SOURCE CODE GENERATION, COMPLETION, CHECKING, CORRECTION" and filed on Nov. 12, 2013, which is incorporated herein in its entirety by reference.

BACKGROUND

Source code is ubiquitous and a great deal of human effort goes into developing it. Developers typically have years of training and experience before they are able to write source code which can be used for the required tasks and which is error free. However, existing systems for automatically generating source code are very limited in terms of the quality of the source code they produce.

Detecting errors in source code and correcting them is typically an ongoing, time consuming process that is not straightforward. Various debugging tools are available to developers but these can be difficult to use especially for novices. Methods for automatically verifying source code are beginning to become available. However, these do not necessarily correct errors in source code or help developers to generate the source code in the first place.

The embodiments described below are not limited to implementations which solve any or all of the disadvantages of known systems for source code generation, or completion or checking or correction.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Automated generation, or completion, or checking, or correcting of source code is described whereby a probabilistic model having been trained using a corpus of natural source code examples is used. In various examples the probabilistic model comprises probability distributions describing belief about structure of natural source code and takes into account source code analysis from a compiler or other source code analyzer. In various examples, source code analysis may comprise syntactic structure, type information of variables and methods in scope, variables which are currently in scope and other data about source code. In various examples, the trained probabilistic model is used to predict sequences of source code elements. For example, to generate source code, to auto-complete source code, to error check source code, to error correct source code or for other purposes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Common reference numerals are used to designate similar parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a source code system using C# with the Roslyn compiler, the system described is provided as an example and not a limitation. As those skilled in the art will appreciate, the present examples are suitable for application in a variety of different types of computing systems using different programming languages and source code analyzers.

Figure 1:
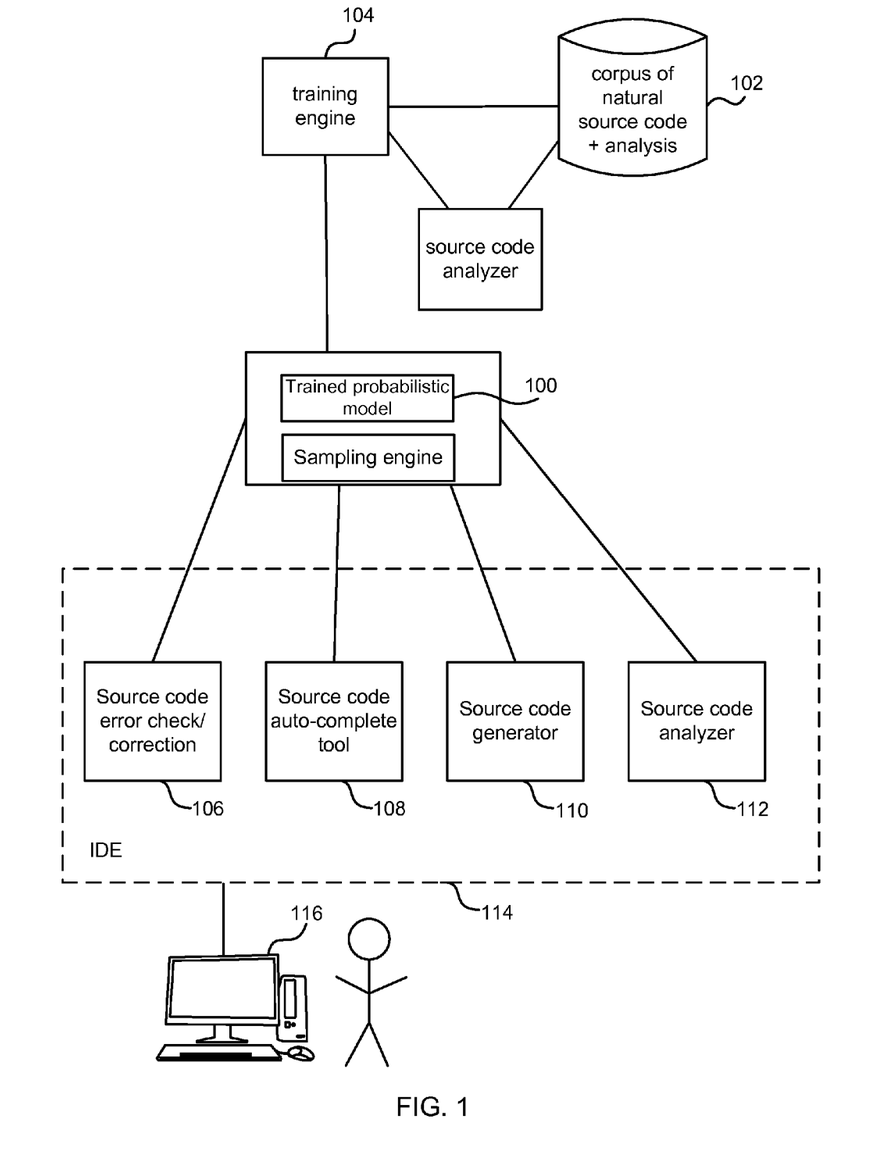
FIG. 1 is a schematic diagram of a trained probabilistic model arranged for any one or more of source code generation, completion, checking, correction.

FIG. 1 is a schematic diagram of a trained probabilistic model arranged for any one or more of source code generation, completion, checking, correction. For example, a programmer operating a personal computer 116 is able to write source code using an integrated development environment (IDE) 114. The integrated development environment incorporates one or more computer-implemented components to assist with the task of writing source code. These comprise one or more of: a source code error checking and/or error correcting component 106, a source code auto-complete component 108, a source code generator 110. The source code generator is able to output new source code, not previously written by the programmer and not merely translated from code written in another programming language.

The IDE also comprises or is in communication with a source code analyzer 112. The source code analyzer is computer implemented using software and/or hardware and may be any component arranged to carry out one or more of: static analysis of source code, extracting syntactic elements from source code, type checking source code, associating variables in source code with definitions of the variables in the source code, associating functions in source code with definitions of the functions in the source code, carrying out data flow analysis of source code, carrying out dependence analysis of source code, carrying out alias analysis of source code, carrying out pointer analysis of source code, carrying out escape analysis of source code. For example, the source code analyzer may be a compiler. Output of the source code analyzer may be used to add to or reduce a number of possible source code elements from which the predictions are calculated.

It is not essential to use an IDE as illustrated in FIG. 1. The components 106, 108, 110 may be used in conjunction with any component enabling a programmer to write source code, or may be used on their own in some examples.

The source code error checking and/or error correcting component 106, the source code auto-complete component 108, and the source code generator 110, are each in communication with a trained probabilistic model 100 which is a type of machine learning system. The trained probabilistic model 100 may be located in the cloud at a remote location. For example, the source code generator 110 may send requests for source code to be generated to the trained probabilistic model 100 in the cloud and may receive the results over a communications network of any suitable type. The source code auto-complete component 108 and the source code checking and/or correction component 106 may operate in a similar manner. It is also possible for the trained probabilistic model 100 to be stored at a computing device local to the IDE 114 or local to one or more of the components 106-110.

The probabilistic model 100 comprises a plurality of probability distributions describing belief about structure (syntactic and/or semantic) of natural source code. It is also arranged to take into account source code analysis output of the source code analyzer 112 (or any other source code analyzer). For example, the source code analyzer 112 is used to limit or prune the number of possible source code elements that may occur next in a sequence of source code elements. Probability distributions with parameters learnt during a training phase, may then be used by a computer-implemented sampling engine to generate samples to predict sequences of source code elements in a manner which takes into account source code analyzer output. For example, type checking output may indicate that some source code elements are not good candidates for a next source code element to be predicted, because they are variables of a wrong type.

The probabilistic model 100 is trained by training engine 104. The training engine uses a corpus of items of natural source code 102 and also uses output of the source code analyzer with respect to the items of natural source code. Natural source code is source code written by human programmers as opposed to machine generated source code. The probabilistic model may be trained using any suitable machine learning update procedures. Some examples are given later in this document although these are examples only and are not intended to be limiting.

In some examples, the corpus has examples from different programmers, with the examples being labeled with who the programmer was such that the probabilistic model may be trained to learn programming styles of individual programmers.

An example computer implemented method at the sampling engine comprises accessing, from a memory, a trained probabilistic model of natural source code written in a programming language, the probabilistic model arranged to take into account source code analysis output of an analyzer operable with the programming language; operating the analyzer to obtain source code analysis of at least part of a sequence of source code elements; and at a processor, calculating from the probabilistic model and the source code analysis, one or more predictions of elements of the sequence of source code elements.

An example computer implemented method at a source code error check component, comprising: receiving source code and sending part of the received source code to a sampling engine; receiving from the sampling engine a sequence of predicted source code elements; comparing the sequence of predicted source code elements with a second part of the received source code and displaying at a graphical user interface potential errors on the basis of the comparison.

Figure 2:
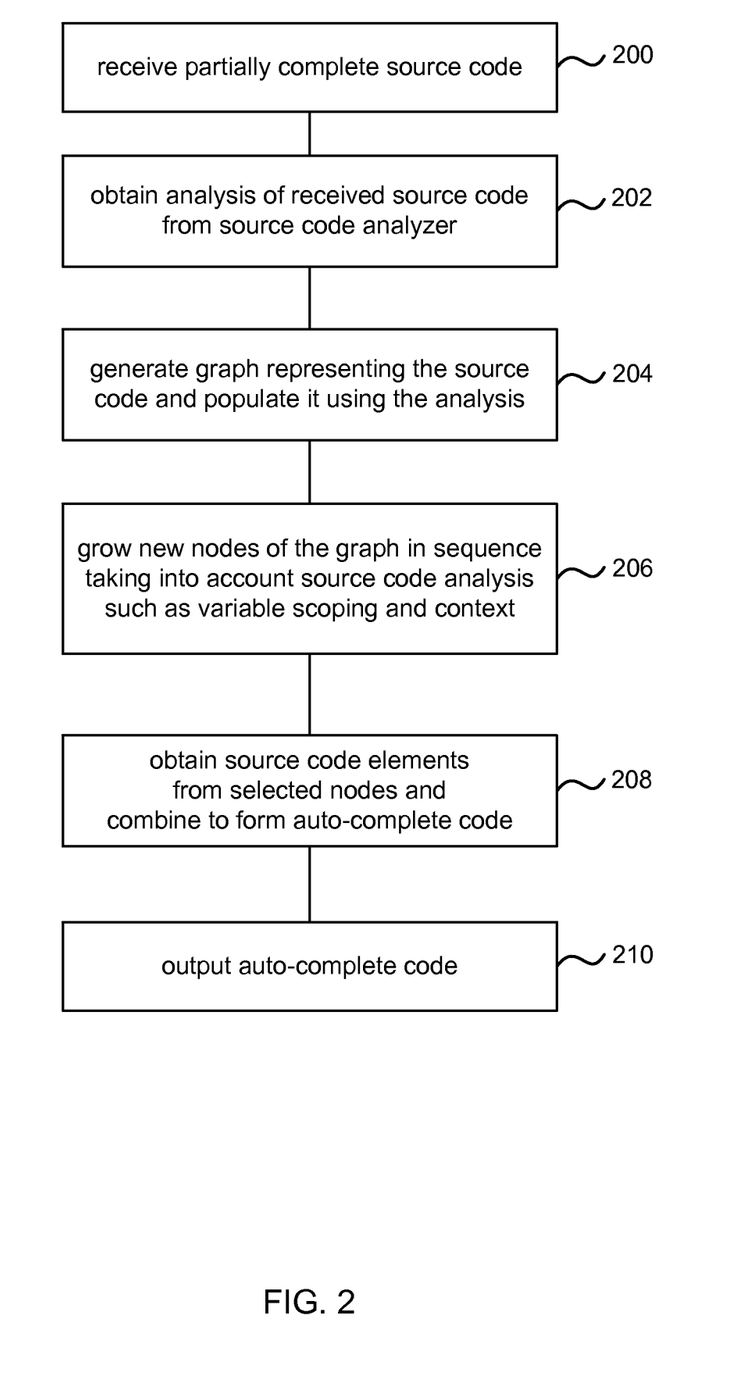
FIG. 2 is a flow diagram of a method at a source code generator or a source code auto-complete tool.

The programmer is able to write source code using IDE 114. In some examples, the source code auto-complete component 108 may present at a graphical user interface suggested source code for completing source code partially written by a programmer. With reference to FIG. 2, the source code auto-complete component 108 receives 200 partially complete source code. For example, this may be source code input by a programmer at the IDE or may be source code retrieved from another source. The component obtains 202 an analysis of the partially complete source code from the source code analyzer 112. For example, the analysis comprises data structures and variables that are instantiated by the source code analyzer as it checks validity of the source code or does other static analysis. In various examples the analysis comprises a flat sequence of tokens where the tokens are strings comprising syntactic elements of a programming language. In various examples the analysis comprises a graph such as a control flow graph or a syntax tree.

In the example described with reference to FIG. 2 the analysis comprises a graph. The source code auto-complete component creates its own version of the graph in memory and populates it using the analysis from the source code analyzer. For example, the graph is populated with scope information. Optionally one or more nodes of the graph may be annotated with type information or other data from the source code analyzer. The graph may represent the source code to be auto-completed. For example, the graph may be an abstract syntax tree. Abstract syntax trees are described in more detail below.

The source code auto-complete component grows 206 one or more new nodes of the graph. This may be done in a sequence such as a depth first order where the graph is a tree, or another type of order. The growing process uses the probability distributions of the trained probabilistic model and it takes into account output of the source code analyzer. For example, it takes into account variable scoping and context. Context may comprise information about the source code which is to be auto-completed.

The source code auto-complete component selects 208 one or more nodes of the graph and obtains source code elements associated with the selected nodes. The source code elements may be concatenated in an order corresponding to an order of the associated nodes in the graph. The result is a string comprising auto-complete source code. The auto-complete source code is output 210 to a graphical use interface or other component.

The process of FIG. 2 may be modified to enable source code to be generated from scratch. In this case partially complete code is not available. The trained probabilistic model is used to grow a graph of nodes, such as a tree or other directed graph, by taking samples from the probability distributions it learnt. As the graph grows source code it generates is analyzed by source code analyzer and this analysis is used to influence ongoing structure (how the nodes are interconnected) and content of the graph of nodes (which source code elements are stored at which nodes) as it grows.

Figure 3:
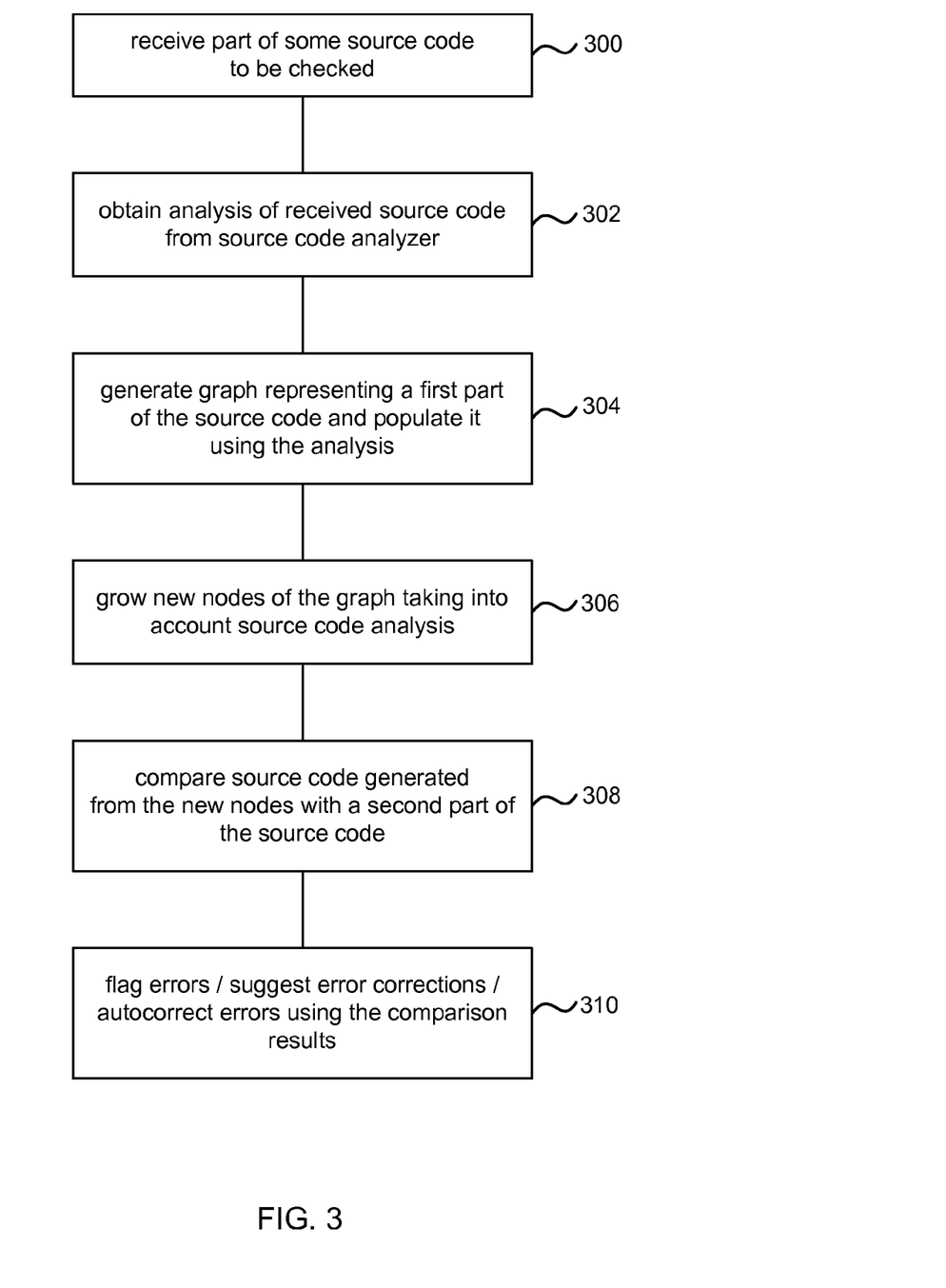
FIG. 3 is a flow diagram of a method at a source code checking and/or correcting tool.

Source code may be checked by error check and/or correction component 106. With reference to FIG. 3 component 106 receives 300 at least a first part of a piece of source code a programmer has written (or information derived from that source code). The component 106 obtains 302 from the source code analyzer an analysis of the received source code. The source code error check/correct component 106 generates a graph (or other structure) representing the first part of the source code and populates 304 it using the analysis. For example, to show variable scope. The component 106 grows 306 new nodes of the graph taking into account the source code analysis. In this way source code is generated by predicting a sequence of source code elements. The source code generated from the new nodes is compared 308 with a second part of the source code to identify potential errors. The component 106 flags the errors and/or suggests corrections to the errors using the comparison results. In some examples the component 106 auto corrects the errors using the comparison results.

For example, errors may be flagged by underlining the differences at a graphical user interface or other display. Possible corrections to the errors may be suggested to the programmer by displaying them in a pop up window or other user interface mechanism. The possible corrections may be determined from the predicted sequence of source code elements.

In the example of FIG. 3 the source code error check/correct component 106 calculates the predicted sequence of source code elements. However, it is also possible for the sampling engine to carry out that process and send the results to the component 106.

An example of a for loop generated by a source code generator such as that of FIG. 1 is now given:

```
for (int i = words; i < 4; ++i) {
    for (int j = 0; j < i; ++j) {
        if (words.Length % 10 == 0) {
            Math.Max(j+j, i*2 + Math.Abs(i+j));
        }
    }
}
```

In some of the examples described herein the code analyzer generates an abstract syntax tree (AST). More detail about abstract syntax trees is now given. Source code begins as one long string. The source code analyser 112 may lex the code into a sequence of tokens, $(\alpha_t)_{t=1}^T = \alpha$, which are themselves strings that serve as atomic syntactic elements of a programming language such as constants or variables. Given $\alpha$, the source code analyser 112 may construct an AST. The AST is a tree of nodes that represents the syntactic structure of code and that serves as an intermediate data structure for use by one or more semantic analysis tools which may be integral with the source code analyser 112. The leaf nodes of the AST may store tokens produced by the lexer. Internal nodes of the AST may store expressions, statements or other high level syntactic elements. From the AST, many crucial properties of the source code may be derived. For example, the tree structure is enough to determine which variables are in scope at any point in the program. An example AST is shown in FIG. 4.

Figure 4:
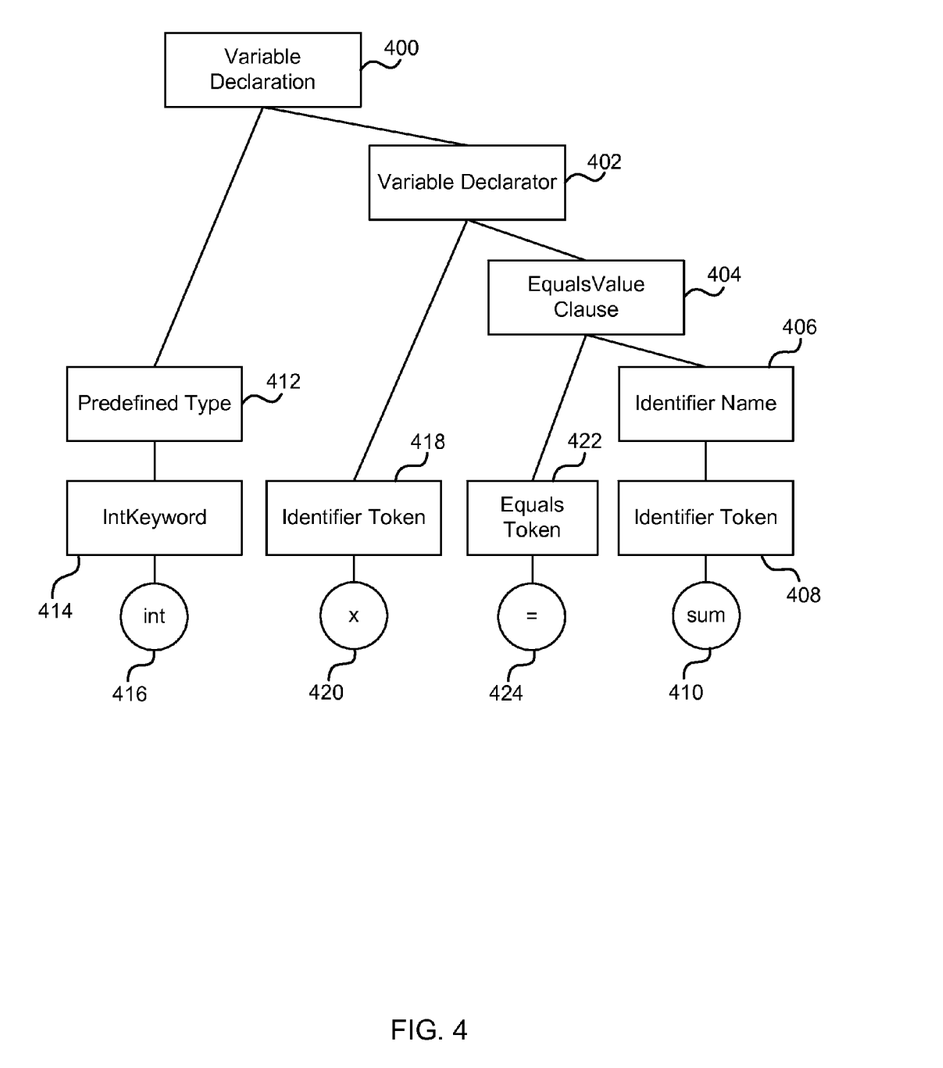
FIG. 4 is a schematic diagram of an abstract syntax tree.

In the example of FIG. 4 the AST has root node 400 representing a variable declaration. The child nodes of the root node 400 in this example are predefined type node 412 and variable declarator node 402. Predefined type node 412 has one child which is intkeyword node 414 in this example. The intkeyword node 414 has one child node which is a leaf node 416 storing the source code element "int". Variable declaratory node 402 has two child nodes, identifiertoken node 418 and EqualsValue clause node 404. The identifertoken node 418 has one child node which is leaf node 420 storing string "x". The EqualsValue clause node 404 has two child nodes, EqualsToken node 422 and Identifier Name node 406. EqualsToken node 422 has one child node which is leaf node 424 storing string "=". Identifier Name node 406 has one child node Identifier Token node 408 which itself has one child node that is leaf node 410 storing string "sum".

A detailed example of a family of probabilistic models that may be used to produce ASTs and so predict source code elements is now given. Log-bilinear Tree-Traversal models (LTTs), which are a family of probabilistic models that produce ASTs. A key property of the model is that the tree is produced in a sequential fashion, according to some traversal order of the nodes in the tree. By generating the AST as a sequence the trained probabilistic model and sampling engine is able to exploit important knowledge, such as variable scoping and other context, at intermediate stages of the process to dramatically improve the quality of the predictions.

In some examples a depth first recursive procedure is used to generate an AST at the sampling engine. Starting at the root of the tree the sampling engine samples the children (i.e. child nodes) and recurses from left to right. Along with the recursive structure that evolves in a hierarchical fashion, there are also variables that evolve sequentially along the path of the tree traversal.

After sampling, the leaf nodes correspond to tokens and the source code can be read off along the leaves of the tree, left to right. A detailed description of the generative procedure is given next.

Notation for various examples using ASTs is now given. A node n can denote either a token such as "sum" or an internal node, such as Block or ForStatement. A children tuple C is a tuple of nodes. Sequential information is captured via traversal variables $h_i$ that evolve sequentially in the depth-first traversal of the tree as it is being produced.

Deterministic traversal variables may be computed deterministically from the current partial tree (the set of nodes and tokens that have been instantiated at step i) that has been generated while latent traversal variables cannot. To refer to a collection of both deterministic and latent traversal variables, the term "traversal variables" is used in this document.

Figure 5:
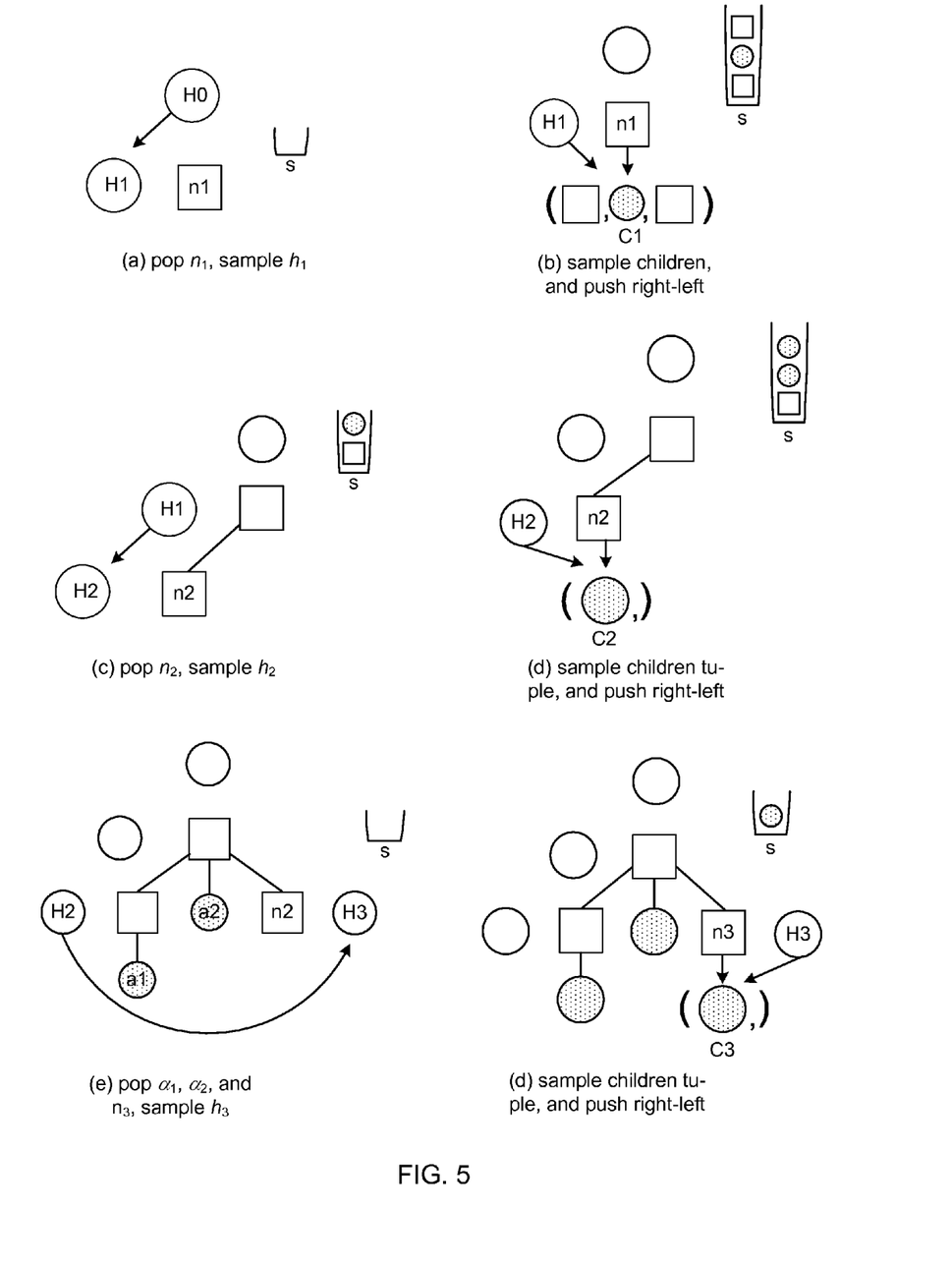
FIG. 5 is a schematic diagram of a sampling process for generating sequences of strings forming source code.

A generative procedure used by the sampling engine may be defined by three distributions: (a) the prior over the root node and traversal variables, p(n, h); (b) the distribution over children nodes conditioned on the parent node and h, denoted p(C|n, h); and (c) the transition distribution for the hs, denoted $p(h_i|h_{i-1})$. An example algorithm for use at the sampling engine to implement this generative procedure is given below and illustrated in FIG. 5. In FIG. 5 rectangles are internal nodes, shaded circles are leaf nodes (tokens), circles are traversal variables and stack S is shown in the state after the computations described in the subcaption. Parentheses indicate tuples of nodes and arrows indicate conditioning. Popping of tokens is omitted for clarity, but note that the tokens are labelled in the order they are encountered.

The sampling engine process produces a sequence of internal nodes $(n_i)_{i=1}^N$, traversal variables $(h_i)_{i=0}^N$, and the desired $\alpha$. A log-bilinear parameterization is added and data from the source code analyser is incorporated into the process used by the sampling engine. Note that while the depth-first traversal order is well-suited for source code, other traversal orders are possible such as right-left or breadth-first.

In various examples, the probabilistic model comprises a number of parameters, the number of parameters being less than a number of parameters fully describing the output from the source code analysis. This enables the examples described herein to work well even for source code which has not previously been seen by the system during training. In order to reduce the number of parameters as mentioned above a log-bilinear form may be used as now described. However, this is one example only; other parameterizations may be used.

One consideration is how to parameterize the distributions in the model, and in particular $p(C|n, h)$. A log-bilinear form may be used, where there is a real-valued vector representation of $(n_i, h_i)$ pairs, $R_{con}(n_i, h_i)$, a real-valued vector representation for the children tuple, $R_{ch}(C_i)$, and a bias term for the children, $b_{ch}(C_i)$.

These may be combined via an inner product, which gives the negative energy of the children tuple $$-E(C_i;n_i,h_i)=R_{ch}(C_i)^T R_{con}(n_i,h_i)+b_{ch}(C_i)$$

The above energy may be exponentiated and normalized to give the probability of sampling the children: $p(C_i|n_i, h_i) \propto \exp\{-E(C_i; n_i, h_i)\}$. The support over which to normalize this distribution may be the set of children tuples observed as children of nodes of type $n_i$ in the training set.

It is possible to define these vector representations R in different ways. In various examples an R matrix may be indexed into with hashable objects to look up D dimensional real-valued vectors. $R_x$ denotes the hash(x)th row of the R matrix. Similarly $b_x$ looks up a real number.

In one variant, each unique C sequence receives the unique representation $R_{ch}(C_i)=R_{C_i}$ and $b_{ch}(C_i)=b_{C_i}$. The representations for (n, h) pairs may be defined compositionally, as a sum of components.

If we view $h_i$ as a sequence of hashable variables, then $h_{ij}$ represents the jth variable. For example, to obtain two distinct binary traversal variables $h_{i1}$ and $h_{i2}$, these may be represented as (key, value) tuples.

The representation may be written as follows:

$$R_{con}(n_i,h_i)=W_0^{con}R_{n_i}+\Sigma_{j=1}^H W_{j_{con}}R_{h_{ij}} \quad (1)$$

The $W^{con}$s are matrices that modulate the contribution of a variable in a position-dependent way. For computational efficiency take $W^{con}$s to be diagonal.

In extensions to the basic models let the representation for children tuples be compositionally defined. The log-bilinear parameterization has the desirable property that the number of parameters grows linearly in the dimension of h, so it is possible to use high dimensional traversal variables without worrying about exponentially bad data fragmentation.

An example of an algorithm for use at a sampling engine such as that of FIG. 1 is now given:

```
initialize empty stack S
sample (n, h_0) ~p(n,h_0)
push n onto S
(i, t) ← (1, 1)
while S is not empty do
    pop the top node n from S
    if n is a internal node then
        n_i ← n
        sample p(h_i | h_{0:i-1},n_{1:i}, α_{1:t})
        sample C_i ~p(C_i | n_i, h_i)
        push n for n ∈ Reversed(C_i) onto S
        i ← i + 1
    else
        α_t ← n
        t ← t + 1
    end if
end while
```

In an example, sample $p(h_i|h_{0:i-1},n_{1:i},\alpha_{1:t})$ may be expressed in words as taking a sample from a probability distribution over latent (unobserved) variables that evolve sequentially over an ordering of the source code elements. The ordering of the source code elements may be related to the structure of the AST.

In examples LTTs are expanded to leverage the full power that the framework admits. The extensions allow (a) traversal variables to depend arbitrarily on the history so long as their values can be determined with certainty based on the partial tree that exists up to the point where the variables are defined; (b) annotating nodes with richer types; and (c) letting $R_{ch}$ be compositionally defined, which becomes powerful when combined with deterministic reasoning about variable scoping.

The evolution of traversal variables may be defined by $p(h_i|h_{0:i-1},n_{1:i},\alpha_{1:t})$ which may be expressed in words as the probability of the traversal variables conditioned on the nodes, branches and leaves of the AST already computed.

Examples where this is useful include variables representing any function of the path from the root of the AST to the current node or any autoregressive connections to the last n tokens or internal nodes.

Some features may not be deterministically computable from the current partial tree, but may help when predicting children nodes. Consider knowing that a BinaryExpression will evaluate to an object of type int. A whole class of such useful knowledge can be encoded by annotating nodes with extra information.

This may be accomplished by letting nodes take values in the cross-product space of the node type space and the annotation space. For example, when adding type annotations nodes may take value (BinaryExpression, int). This approach can cause certain problems. First, the range of parent nodes increases exponentially as annotations are added. Second, since the annotations are uncertain, there are more choices of node values at each step of the generative procedure, and this incurs a cost in log probabilities when evaluating a model. For example, if is found that simply annotating expression nodes with type information led to worse log probabilities of generating held out data: while the cost of generating tokens decreased because the model had access to type information, the increased cost of generating type annotations along with nodetypes outweighed the improvement.

In experiments, it is found that children of IdentifierToken nodes are the source of greatest uncertainty when generating a program. IdentifierToken nodes are very common and are parents of all tokens that are not built-in language keywords (e.g., IntKeyword or EqualsToken) or constants (e.g., StringLiterals). This primarily includes variable and method names.

One of the most powerful features in predicting which IdentifierToken will be drawn at any point in a program is what variables have previously been declared and are currently in scope. There are also other useful cues such as how recently the variable was declared, what the type the variable is, and how recently the variable has been assigned. This information may be used as follows.

In various examples scope is represented as a set of variable feature vectors. Each feature vector contains a string identifier corresponding to the variable along with other features of the variable, like those described above. A variable is "in scope" if there is a feature vector in the scope set that has a string identifier that is the same as the variable's identifier.

When sampling an identifier token, a two step procedure may be used by the sampling engine. First, decide whether this identifier token will be sampled from the current scope. This is accomplished by annotating each IdentifierToken internal node with a binary variable that has the states global or local. If local, proceed to use the local scope model defined next. If global, sample from a global identifier token model that gives support to all identifier tokens.

The scope set may be updated deterministically as the sampling engine traverses the AST by recognizing patterns that correspond to when variables should be added or removed from the scope. The sampling engine may implement logic for at least three cases: parameters of a method, locally declared variables, and class fields that have been defined prior in the class definition. Class fields defined after the current point in the code are not included, and variables and methods available in included namespaces are not included.

All that remains is to define how to draw a child of a (IdentifierToken, local) parent node. Given the scope set which contains variable feature vectors $\{v_\alpha\}$, the probability of selecting token a is proportional to $p(\alpha|n_i, h_i) \propto \exp\{-E(\alpha; n_i, h_i)\}$, by normalizing over the variables currently in scope, and where the representation of the possible children is defined compositionally. Specifically, let $R_{ch}(\alpha)$ and $b_{ch}(\alpha)$ be defined as follows:

$$R_{ch}(\alpha) = \Sigma_{u=1}^V W_u^{ch} R_{v_{au}} \quad b_{ch}(\alpha) = \Sigma_{u=1}^V b_{v_{au}} \quad (2)$$

For example, if a variable in scope has feature vector (identifier, type, how recently declared, how recently assigned)=("i", int, 3, 0), then its corresponding $R_{ch}$ would be a context matrix-modulated sum of representations for (identifier="i"), (type=int), (how recently declared=3), and (how recently assigned=0). This representation may then be combined with the compositional context representation as in the basic model. Note that the identifier feature is the same hashable object as token nodes of the same string, thus they share their representation vector.

In order to train and evaluate LTTs, the training engine may perform at least two computations: computing the log probability of a token sequence, and taking the gradient of the log probability with respect to model parameters. This is now described.

In a first case, where traversal variables are deterministic only, we assume that any traversal variables $h_t$ that appear in the model can be computed deterministically from the current partial tree. In this case, for each program $\alpha_m$, use the source code analyzer to compute the full AST corresponding to $\alpha_m$, then use the AST to deterministically compute the valid setting of the traversal variables. At this point, all variables in the model can be treated as observed. Since LTTs are directed models, this means that the total log probability is a sum of log probabilities at each production, and learning decomposes into independent problems at each production. Thus, stack all productions into a single training set and follow gradient-based procedures for training log-bilinear models.

In a second case, allow latent traversal variables that need to be summed over in order to compute the probability of a token sequence. In this case, the traversal variables couple the learning across different productions from the same tree. For simplicity and to allow efficient exact inference, restrict these latent traversal variables to be a single discrete variable at each step (although this restriction may be lifted by using approximate inference). In this case, formulate an expectation maximization (EM) algorithm for the learning where an exact E step can be implemented using the forward-backward algorithm.

More formally, under the above assumption the probability of a takes the following form: $\Sigma_{h_{0:N}} p(n_1, h_0) \Pi_{i=1} p(C_i|n_i, h_i) p(h_i^l|h_{i-1}^l) \times p(h_i^d|h_{0:i-1}, n_{1:i}, \alpha_{1:i})$ where the notation $h_i^l$ means a latent traversal variable and $h_d^i$ means a set of deterministic traversal variables, and where $h_t$ represents the union of $\{h_d^i\}$ and 14. Firstly, the $p(h_d^i|\cdot)$ terms drop off because as above the source code analyser may be used to compute the AST from $\alpha$ then use the AST to deterministically fill in the only legal values for the $h_i^d$ variables, which makes these terms always equal to 1. It then becomes clear that the sum can be computed using the forward-backward algorithm. For learning, follow the EM formulation and lower bound the data log probability with a free energy of the following form (which for brevity drops the prior and entropy terms):

$$\Sigma_{i=2}^N \Sigma_{h_i^l} \Sigma_{h_{i-1}^l} Q_{i,i-1} = h_i^l, h_{i-1}^l) \log P(h_i^l|h_{i-1}^l) + \Sigma_{i=1}^N \Sigma_{h_i^l} Q_i (h_i^l) \log p(C_i|h_i)$$

In the E step, the Q's are updated optimally given the current parameters using the forward backward algorithm. In the M step, given Q's, the learning decomposes across productions. Represent the transition probabilities using a simple tabular representation and use stochastic gradient updates. For the emission terms, it is again possible to use logbilinear model training. The only difference from the previous case is that there are now K training examples for each i, one for each possible value of $h_i^l$, which are weighted by their corresponding $Q_i(h_i^l)$. A way of handling this so that log-bilinear training methods can be used unmodified is to sample $h_i^l$ values from the corresponding $Q_i(\cdot)$ distribution, then to add unweighted examples to the training set with values being given their sampled value. This can then be seen as a stochastic incremental M step.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPUs).

Figure 6:
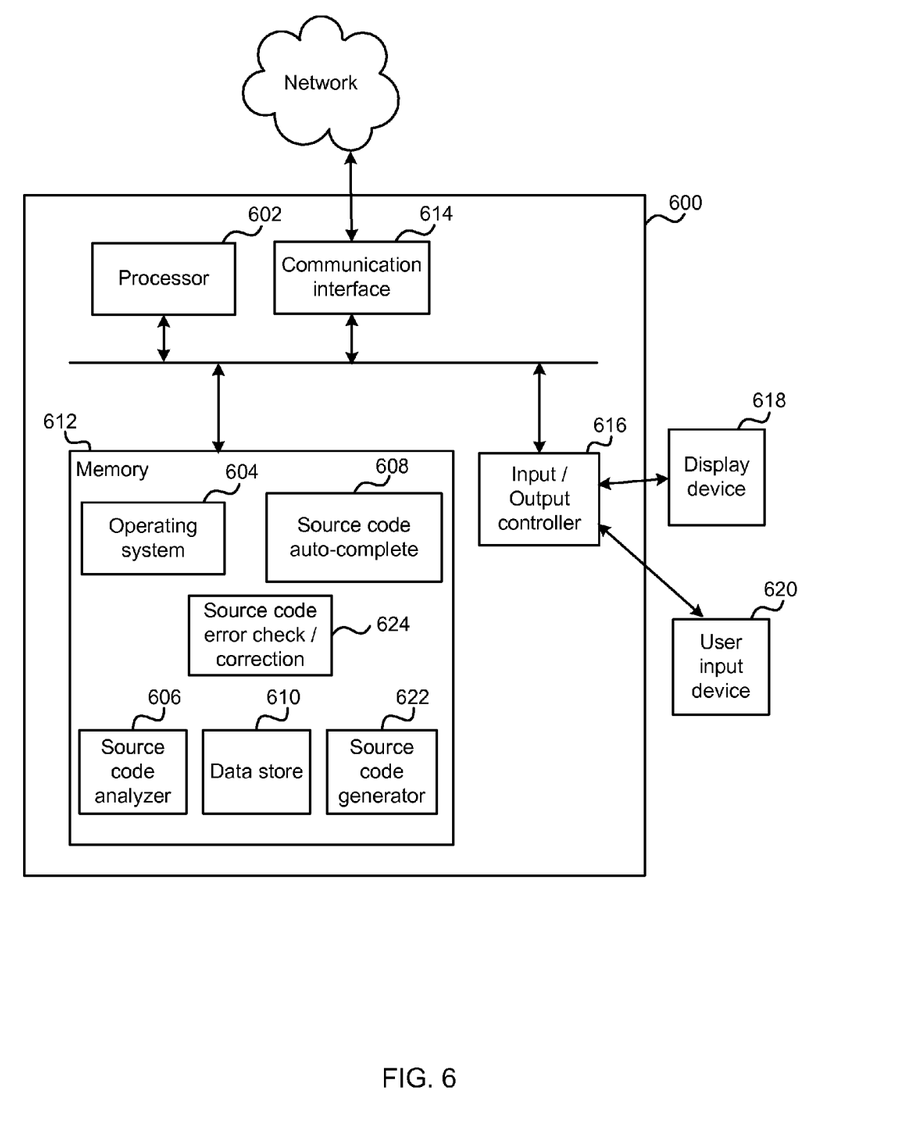
FIG. 6 illustrates an exemplary computing-based device in which embodiments of a source code generating, or completing, or checking or correcting system may be implemented.

FIG. 6 illustrates various components of an exemplary computing-based device 600 which may be implemented as any form of a computing and/or electronic device, and in which embodiments any one or more of: a source code generator, a source code auto-completor, a source code error checker, a source code error corrector may be implemented.

Computing-based device 600 comprises one or more processors 602 which may be microprocessors, controllers or any other suitable type of processors for processing computer executable instructions to control the operation of the device in order do one or more of: generate source code, auto-complete source code, error check source code, error correct source code. In some examples, for example where a system on a chip architecture is used, the processors 602 may include one or more fixed function blocks (also referred to as accelerators) which implement a part of the method of source code generation, auto-completion, error checking, error correcting in hardware (rather than software or firmware). Platform software comprising an operating system 604 or any other suitable platform software may be provided at the computing-based device to enable application software to be executed on the device. A source code analyser 606 is optionally present at the computing device. A source code auto-complete component 608 may be present. A source code generator 622 may be present. A source code error check and/or error correction component 624 may be present. A data store 610 holds data such as natural source code examples, probability distribution parameters, context data from the source code analyser 606, and other data.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 612) is shown within the computing-based device 600 it will be appreciated that the storage may be distributed or located remotely and accessed via a network or other communication link (e.g. using communication interface 614).

The computing-based device 600 also comprises an input/output controller 616. Input/output controller 616 is arranged to output display information to a display device 618 which may be separate from or integral to the computing-based device 600. The display information may provide a graphical user interface. The input/output controller is also arranged to receive and process input from one or more devices, such as a user input device 620 (e.g. a mouse, keyboard). In some examples the user input device 620 may detect voice input, user gestures or other user actions and may provide a natural user interface (NUI). This user input may be used to write source code, accept or reject auto-complete suggestions, accept or reject error corrections, set parameter values, input training data or for other purposes. In an embodiment the display device 618 may also act as a user input device if it is a touch sensitive display device. The input/output controller may also output data to devices other than the display device, e.g. a locally connected printing device.

Any of the input/output controller 616 display device 618 and the user input device 620 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer implemented method comprising:
   accessing, from a memory, a trained probabilistic model of natural source code written in a programming language, the trained probabilistic model arranged to take into account source code analysis output of an analyzer operable with the programming language;
   operating the analyzer to obtain source code analysis of at least part of a sequence of source code elements, the source code analysis comprising a graph of syntactic structure of the sequence of source code elements;
   operating the analyzer to determine which variables are in scope at any point in the program, wherein:
      scope is represented as a set of feature vectors;
      at least one feature vector comprises a string identifier corresponding to a feature vector variable;
      the at least one feature vector further comprises a data related to at least one of: how recently the feature vector variable was declared, or how recently the feature vector variable was assigned; and
      the determination comprises determining whether a string identifier of a given variable is the same as a string identifier corresponding to a feature vector variable in the set of scope feature vector variables; and
   at a processor:
      calculating the trained probabilistic model and the source code analysis, one or more predictions of elements of the sequence of source code elements;
      identifying source code errors by comparing the one or more predicted elements with source code previously generated; and
      correcting the identified source code errors using the one or more predicted elements.

2. A method as claimed in claim 1 comprising calculating the predictions by using the source code analysis to add to or reduce a number of possible source code elements from which the predictions are calculated.

3. A method as claimed in claim 1 comprising adding the one or more predicted elements to the sequence of source code elements.

4. A method as claimed in claim 1 wherein the source code is previously generated by a human.

5. A method as claimed in claim 4 comprising generating graphical user interface output suggesting corrections to the identified source code errors on the basis of the one or more predicted elements.

6. A method as claimed in claim 4 comprising automatically correcting the identified source code errors using the one or more predicted elements.

7. A method as claimed in claim 1 comprising generating a graphical user interface display suggesting the one or more predicted elements to a user and providing certainty information associated with the predicted elements.

8. A method as claimed in claim 1 wherein the source code analysis comprises any one or more of: static analysis of source code, extracting syntactic elements from source code, type checking source code, associating variables in source code with definitions of the variables in the source code, associating functions in source code with definitions of the functions in the source code, carrying out data flow analysis of source code, carrying out dependence analysis of source code, carrying out alias analysis of source code, carrying out pointer analysis of source code, carrying out escape analysis of source code.

9. A method as claimed in claim 1 wherein the graph is any of: a control flow graph, a flat sequence of node, a tree.

10. A method as claimed in claim 1 wherein the graph comprises a plurality of nodes populated with data from an abstract syntax tree calculated by the compiler.

11. A method as claimed in claim 10 wherein at least some of the nodes are annotated with a type of an expression associated with the node.

12. A method as claimed in claim 10, the trained probabilistic model comprising a number of parameters, the number of parameters being less than a number of parameters fully describing the output from the source code analysis.

13. A method as claimed in claim 10, the trained probabilistic model comprising at least a probability distribution over child nodes of the graph conditioned on associated parent nodes of the graph.

14. A method as claimed in claim 1, the trained probabilistic model comprising at least a probability distribution over latent variables that evolve sequentially over an ordering of the source code elements.

15. One or more device-readable computer storage media comprising:
   device-executable instructions to access a corpus of examples of natural source code written in a programming language;
   device-executable instructions to access source code analysis for the examples from an analyzer operable with the programming language, the source code analysis comprising a graph of syntactic structure of the sequence of source code elements and an indication of which variables are in scope at any point in the program, wherein:

scope is represented as a set of feature vectors;
at least one feature vector comprises a string identifier corresponding to a feature vector variable;
the at least one feature vector further comprises data related to at least one of: how recently the feature vector variable was declared, or how recently the feature vector variable was assigned; and
the determination comprises determining whether a string identifier of a given variable is the same as a string identifier corresponding to a feature vector variable in the variable was assigned;
device-executable instructions to calculate, from the corpus of examples and the source code analysis, one or more predictions of elements of the sequence of source code elements;
device-executable instructions to identify source code errors by comparing the one or more predicted elements with source code previously generated; and
device-executable instructions to correct the identified source code errors using the one or more predicted elements.

16. One or more device-readable storage media as claimed in claim 15 wherein the corpus of examples is from a programmer such that the probabilistic model is trained to learn a programming style of the programmer.

17. A computing apparatus comprising:
a memory storing a trained probabilistic model of natural source code written in a programming language, the trained probabilistic model arranged to take into account source code analysis output of an analyzer; and
a processor coupled to the memory and configured to execute the analyzer to compute analysis of at least part of a sequence of source code elements, the source code analysis comprising an abstract syntax tree of the sequence of source code elements,
the processor executing the analyzer further configured to determine which variables are in scope at any point in the program, wherein:
scope is represented as a set of feature vectors;
at least one feature vector comprises a string identifier corresponding to a feature vector variable; and
the determination comprises determining whether a string identifier of a given variable is the same as a string identifier corresponding to a feature vector variable in the set of scope feature vector variables; and
the processor further configured to:
calculate, from the trained probabilistic model and the source code analysis, one or more predictions of elements of the sequence of source code elements, the calculation comprising a depth-first traversal of the abstract syntax tree to produce a sequence of internal nodes, traversal variables, and tokens;
identify source code errors by comparing the one or more predicted elements with source code previously generated; and
correct the identified source code errors using the one or more predicted elements.

18. A computing apparatus as claimed in claim 17 comprising an interactive development environment for the programming language which is arranged to receive at least part of the sequence of source code elements from user input.

19. A computing apparatus as claimed in claim 17 wherein the analyzer comprises a type checker.

20. A computing apparatus as claimed in claim 17 wherein the source code analysis comprises any one or more of: static analysis of source code, extracting syntactic elements from source code, type checking source code, associating variables in source code with definitions of the variables in the source code, associating functions in source code with definitions of the functions in the source code, carrying out data flow analysis of source code, carrying out dependence analysis of source code, carrying out alias analysis of source code, carrying out pointer analysis of source code, carrying out escape analysis of source code.

* * * * *